Patented May 2, 1933

1,907,203

UNITED STATES PATENT OFFICE

MILTON WRUBLE, OF DETROIT, MICHIGAN

COATING FOR TABLETS, CAPSULES, AND PILLS

No Drawing. Application filed June 3, 1930. Serial No. 459,124.

My invention relates to a new and useful improvement in a coating for tablets, capsules, and pills and particularly to an enteric coating whereby medicament may be administered in tablet, capsule, or pill form and conveyed to the intestinal tract before the coating is dissolved and the medicament released. The purpose of the invention is to provide a coating whereby this result may be achieved.

It is another object of the invention to provide a coating of this character which may be applied to medicaments and administered in such quantities as may be desired without any dangerous physiological effect and without any likelihood of undesirable pathological reactions from the coating itself.

It is another object of the invention to provide a coating of this class which will protect the material coated from the acids and juices in the stomach and yet at the same time be of such a nature that they will be dissolved in the intestinal tract for releasing the medicine.

The coating consists of shellac dissolved in ammonia or in ammonia and alcohol. When the shellac is dissolved in ammonia there is a change in character of the shellac, the exact nature of the change not being fully understood but it is believed that the aliphatic acids of the shellac are neutralized. It is preferred to employ equal quantities of U. S. P. ammonia and of 95% alcohol. The alcohol is employed merely to facilitate and hasten evaporation and prevent penetration of the coating into the tablet, capsule, or pill. The quantity of alcohol and ammonia used is sufficient for dissolving the shellac and experience has shown that for most desirable results the shellac should remain in the dissolving solution from twelve to sixteen hours.

The pill, capsule, or tablet is coated by either having the composition sprayed on the pill or tablet or by the regular pan coating method.

When the pill, capsule, or tablet so coated is taken by a person, the coating is proof against the acids and juices of the stomach so that the pill or tablet will pass substantially intact into the intestines. This is undoubtedly due to the fact that the coating is alkaline in nature (neutral after volatilization of solvent) and therefore in addition to the ammonia which is an alkali other suitable alkalies may be used for dissolving the shellac. It is, of course, necessary that the alkali used be such that when the pill or tablet is taken internally there may be no undesirable action set up. The juices in the intestinal tract being alkaline will act sufficiently quickly upon the pill or tablet to release the medicine so that the pathological reaction sought may be obtained. This nature of coating is particularly desirable where gland substances and similar ingredients which would be destroyed by the stomach acids and juices are administered in the form of a coated pill or tablet.

The proportion of the solution to the shellac would be evident to one skilled in the art, but sufficient of the solvent being necessary for dissolving purposes.

It is desired that pure bleached flake shellac be used free from arsenic and I have found that for best results 25% solutions of shellac dissolved in equal quantities of ammonia (U. S. P.) and alcohol (95%) are of the correct consistency.

It is desirable to add the ammonia solution to the shellac first to allow the reaction to take place and then to add the alcohol.

What I claim as new and desire to secure by Letters Patent is:

1. An enteric coating for pills and tablets, consisting of the product resulting from shellac dissolved in ammonia.

2. A composition for coating pills and tablets, consisting of the product resulting from shellac dissolved in ammonia together with alcohol.

In testimony whereof I have signed the foregoing specification.

MILTON WRUBLE.